United States Patent [19]

Gellert

[11] Patent Number: 5,427,519
[45] Date of Patent: Jun. 27, 1995

[54] INJECTION MOLDING NOZZLE WITH HELICAL COOLING CONDUIT

[76] Inventor: Jobst U. Gellert, 7A Prince Street, Georgetown, Ontario, Canada, L7G 2X1

[21] Appl. No.: 276,409

[22] Filed: Jul. 18, 1994

[30] Foreign Application Priority Data

Jun. 30, 1994 [CA] Canada .................................. 2127210

[51] Int. Cl.6 .............................................. B29C 45/20
[52] U.S. Cl. ................................ 425/549; 264/328.15; 425/570
[58] Field of Search ........................ 425/549, 568, 570; 264/328.15

[56] References Cited

U.S. PATENT DOCUMENTS 4,403,405 9/1983 Gellert .................................. 29/611

FOREIGN PATENT DOCUMENTS 2341589 8/1973 Germany .

Primary Examiner—Tim Heitbrink
Attorney, Agent, or Firm—Dalesman & Company

[57] ABSTRACT

An injection molding nozzle for cold runner molding thermosetting molding material in a heated mold. A bore extends centrally through the nozzle to convey liquid molding material from a cooled distribution manifold to a gate leading to a cavity. An integral cooling fluid conduit has a helical portion extending concentrically around the molding material bore. Cooling fluid circulates from a radial inlet portion to a radial outlet portion of the cooling fluid conduit to cool the liquid molding material flowing through the central bore.

6 Claims, 2 Drawing Sheets

INJECTION MOLDING NOZZLE WITH HELICAL COOLING CONDUIT

BACKGROUND OF THE INVENTION

This invention relates generally to injection molding and more particularly to a cold runner injection molding nozzle which effectively cools the liquid molding material flowing through it.

Modern hot runner injection molding systems require a number of nozzles through which melt flows from a melt distribution manifold to the different gates. Nozzles which are heated by an integral electrical heating element with a helical portion encircling a central melt channel to heat the melt flowing through the channel are well known for molding thermoplastic materials. An example of such a heated nozzle is shown in the applicant's U.S. Pat. No. 4,403,405 which issued Sep. 13, 1983.

However, when molding materials such as two-component silicon rubber or other liquid molding materials which are thermosetting rather than thermoplastic and have cool runners rather than hot runners, the two components are mixed just before injection into a cavity in a hot mold. This requires that the mold must be heated rather than cooled and the molding material must be retained well below its cross-linking temperature as it flows through the nozzle. An example of apparatus for molding thermosetting materials is seen in German Patent Application Number P23 41 589.6 to Delbrouck which was laid-open Aug. 17, 1973. However, in that case, the liquid molding material flows around an elongated probe through which cooling water flows. In other words, the liquid molding material flows between the cooled probe and the heated mold which has the disadvantage that the temperature of the liquid molding material is not very uniform because it is cooler near the inside and hotter near the outside.

SUMMARY OF THE INVENTION

Accordingly, it is an object of the present invention to at least partially overcome the disadvantages of the prior art by providing an injection molding nozzle in which cooling fluid flows around the liquid molding material channel to retain the liquid molding material at a more uniform temperature.

To this end, in one of its aspects, the invention provides an injection molding nozzle having a rear end, a front end and a liquid molding material channel extending therethrough to convey liquid molding material frontwardly towards at least one gate, each at least one gate extending through the mold to a cavity, having the improvement wherein the liquid molding material channel extends through the nozzle from a central inlet at the rear end, and the nozzle has an integral cooling fluid conduit with an inlet portion, an outlet portion and a helical portion, the helical portion extending concentrically around at least a portion of the liquid molding material channel whereby cooling fluid circulating through the cooling fluid conduit cools the liquid molding material flowing frontwardly through the liquid molding material channel.

Further objects and advantages of the invention will appear from the following description taken together with the accompanying drawings.

DETAILED DESCRIPTION OF THE INVENTION

Figure 1:
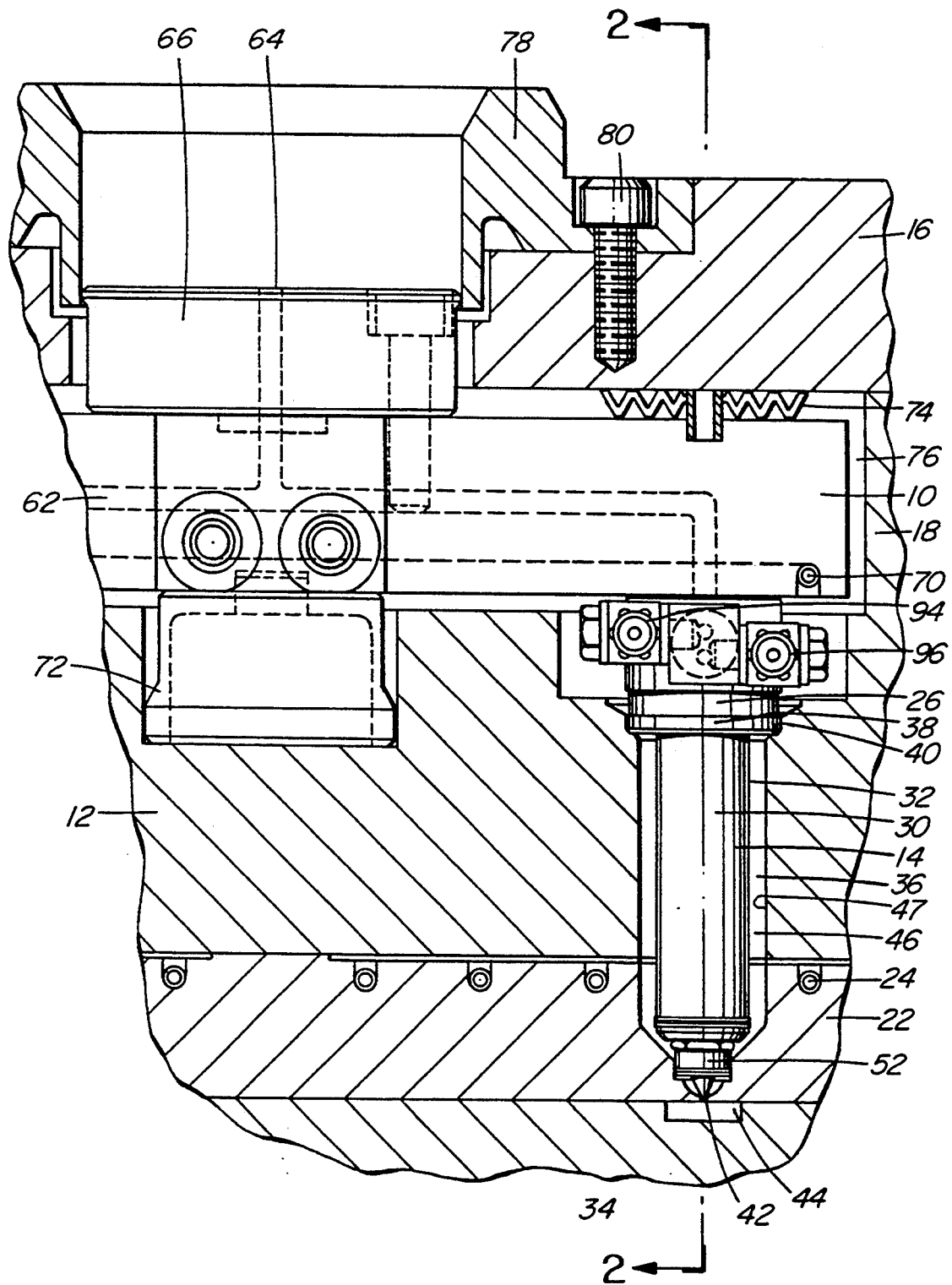
FIG. 1 is a partial sectional view of a portion of a multi-cavity thermosetting injection molding system showing a nozzle according to a preferred embodiment of the invention.
Figure 2:
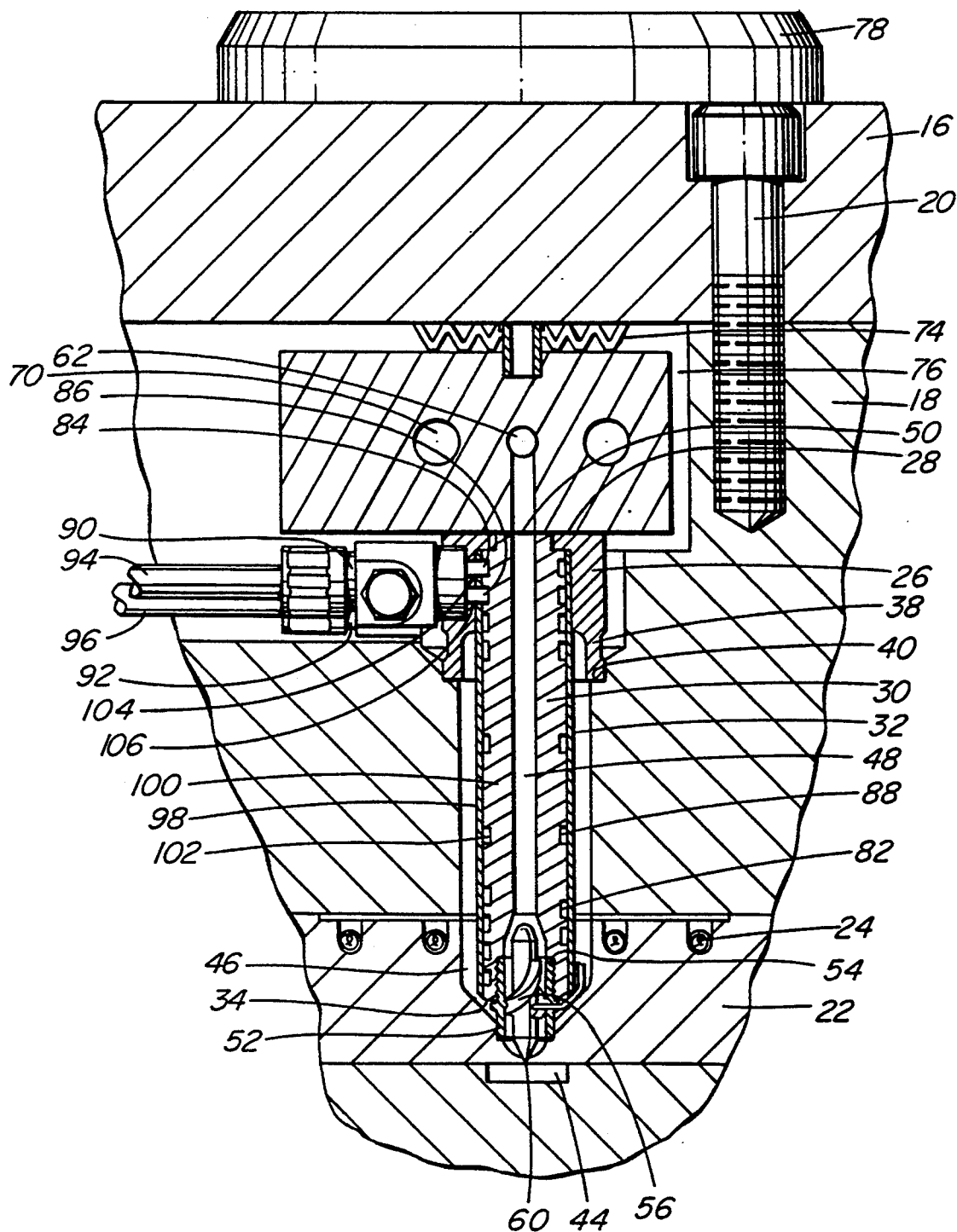
FIG. 2 is a sectional view along line 2—2 in FIG. 1.

Reference is made to both FIGS. 1 and 2 which show a portion of a multi-cavity injection molding system or apparatus having a manifold 10 seated in a mold 12 to distribute liquid molding material between a number of nozzles 14 (only one of which is shown). While the mold 12 usually has a greater number of plates depending on the application, in this case only a back plate 16 secured to a manifold retainer plate 18 by bolts 20 and a cavity plate 22 are shown for ease of illustration. The mold 12 is heated by an electrical heating element 24 integrally embedded in the cavity plate 22. Each nozzle 14 has an outer collar portion 26 which extends from the rear end 28 around a smaller diameter central portion 30 with a cylindrical outer surface 32 extending to the front end 34. The nozzle 14 is seated in a well 36 in the mold 12 by a circular locating flange 38 which extends from the outer collar portion 26 and sits on a circular shoulder 40 in the well 36 to accurately locate the nozzle 14 in alignment with a gate 42 extending through the cavity plate 22 to a cavity 44. Thus, an insulative air space 46 is provided between the central portion 30 of the nozzle 14 and the surrounding inner surface 47 of the well 36. As seen in FIG. 2, in this embodiment, the nozzle 14 has a central bore or channel 48 which extends therethrough from an inlet 50 at the rear end 28 in alignment with a torpedo 52 which is securely screwed into a threaded seat 54 in the front end 34. The torpedo 52 has a pair of spiral blades 56 extending around a central shaft 58 with a pointed front tip 60 extending into the gate 42. In other embodiments, a nozzle seal or gate insert can be used to bridge the insulative air space 46, the central bore or channel 48 can branch outwardly near the front end 34 of the nozzle 14 to several spaced edge gates or the apparatus can be valve gated with a reciprocating valve member to open and close the gate.

A liquid molding material passage 62 branches in the distribution manifold 10 to convey pressurized liquid molding material received from a molding machine (not shown) at an inlet 64 in a manifold extension 66 through the central bore 48 in each nozzle 14 to the cavities 44. The distribution manifold 10 is cooled below the cross-linking temperature of the liquid molding material by pumping cooling water or other suitable cooling fluid through cooling fluid conduits 70. The liquid molding material distribution manifold 10 is mounted between the back plate 16 and the manifold retaining plate 18 by a central locating ring 72 seated in the manifold retaining plate 18 and several insulative and resilient spacer members 74 with an insulative air space 76 between the cooled manifold 10 and the surrounding heated mold 12. As can be seen, the manifold 10 is located laterally by a locating collar 78 attached to the back plate 16 by bolts 80.

Reference is now made particularly to FIG. 2 in describing the structure of the nozzle 14 according to a preferred embodiment of the invention. The nozzle 14 has an integral cooling fluid conduit 82 with an inlet portion 84, an outlet portion 86, and a helical portion 88. As can be seen, the inlet and outlet portions 84, 86 of the cooling fluid conduit 82 each extend radially through the outer collar portion 26 of the nozzle 14 to threaded connectors 90, 92 to respectively receive supply and return lines 94, 96 for cooling water or other suitable cooling fluid. The helical portion 88 of the cooling fluid channel 82 extends into the central portion 30 of the nozzle 14 concentrically around the central liquid molding material channel 48. As described below, the helical portion 88 of the cooling fluid channel 82 is integrally embedded in the nozzle 14 with predetermined distances between it and the central liquid molding material channel 48 and the outer surface 32 of the central portion 30 of the nozzle 14.

The method of making the nozzle 14 will now be described with particular reference to FIG. 2. The components are made and assembled as shown, with the elongated central portion 30 having a stainless steel outer sleeve 98 which is mounted over an inner part 100 in which a spiral groove 102 has been machined to form the helical portion 88 of the cooling conduit 82. Two pieces 104, 106 of stainless steel tubing are mounted to extend from opposite ends of the spiral groove 100 radially out through the outer steel collar portion 26 to the connectors 90, 92 to form the inlet and outlet portions 84, 86 of the cooling conduit 82. During assembly, nickel alloy brazing paste is applied along the joins between the components and they are then gradually heated in a vacuum furnace to a temperature of approximately 1925° F. which is above the melting temperature of the nickel alloy brazing paste. As the furnace is heated, it is evacuated to a relatively high vacuum to remove substantially all of the oxygen and then partially backfilled with an inert gas such as argon or nitrogen. When the melting point of the brazing paste is reached, it melts and flows between the abutting surfaces of the components by capillary action to integrally braze them together to form the nozzle 14. Brazing them together in a vacuum furnace provides a metallurgical bonding of the components together which prevents leakage of cooling fluid from the cooling conduit 82 and provides optimal thermal conductivity.

In use, the injection molding system is assembled as shown. While only a single cavity 44 has been shown for ease of illustration, it will be appreciated that the liquid molding material distribution manifold 10 normally has many more liquid molding material passage branches extending to numerous cavities 44 depending on the application. Cooling water is circulated through the cooling conduit 70 in the distribution manifold 10 and through the cooling conduits 82 in each of the nozzles 14 to cool them to a predetermined temperature below the cross-linking temperature of the molding material. Electrical power is applied to the heating element 24 in the cavity plate 22 to heat the mold 12 around the cavity 44 to a predetermined temperature above the cross-linking temperature of the molding material. Pressurized liquid molding material from a molding machine (not shown) is then injected into the molding material passage 62 through the central inlet 64 according to a predetermined cycle. The pressurized liquid molding material flows through the central molding material bore 48 of each nozzle 14, between the spiral blades 56 of the torpedo 52, and through the gate 42 to the cavity 44. The flow of molding material between the fixed spiral blades 56 of the torpedo 52 imparts a swirling motion to the molding material which is accelerated as the molding material approaches the gate 42 and results in the molding material flowing outwardly in the cavity 44 near the gate 42 with a curving motion. This avoids unidirectional molecular orientation of the molding material, at least adjacent the gate 42, and provides a stronger product in the gate area. After the cavities 44 are filled, injection pressure is held momentarily to pack and then released. After a solidification period, the mold is opened to eject the molded products. After ejection, the mold is closed and injection pressure is reapplied to refill the cavities 44. This injection cycle is continuously repeated with the frequency dependent on the size and shape of the cavities 44 and the type of material being molded.

While the description of the cold runner injection molding nozzle according to the invention has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an injection molding nozzle having a rear end, a front end and a liquid molding material channel extending therethrough to convey liquid molding material frontwardly towards at least one gate, each at least one gate extending through a heated mold to a cavity, having the improvement wherein;

the liquid molding material channel extends through the nozzle from a central inlet at the rear end, and the nozzle has an integral cooling fluid conduit with an inlet portion, an outlet portion and a helical portion, the helical portion extending concentrically around at least a portion of the liquid molding material channel whereby cooling fluid circulating through the cooling fluid conduit cools the liquid molding material flowing frontwardly through the liquid molding material channel.

2. An injection molding nozzle as claimed in claim 1 having an elongated central portion with a generally cylindrical outer surface and an outer collar portion extending around the central portion adjacent the rear end, the nozzle to be seated in a well in said heated mold with an insulative air space extending between the outer surface of the central portion of the nozzle and the surrounding inner surface of the well.

3. An injection molding nozzle as claimed in claim 2 wherein the helical portion of the cooling fluid conduit extends along the central portion of the nozzle and the inlet portion and outlet portion of the cooling fluid conduit extend from the helical portion of the cooling fluid conduit radially outward through the outer collar portion of the nozzle.

4. An injection molding nozzle as claimed in claim 3 wherein the liquid molding material channel extends centrally through the nozzle from the rear end to the front end, and the helical portion of the cooling fluid conduit is spaced with predetermined distances between the central liquid molding material channel and the outer surface of the central portion of the nozzle.

5. An injection molding nozzle as claimed in claim 4 wherein the inlet portion of the cooling fluid conduit is a first integral tube extending inwardly through the outer collar portion of the nozzle to the helical portion of the fluid conduit, and having a first outer connection to be connected to a cooling fluid supply line.

6. An injection molding nozzle as claimed in claim 5 wherein the outlet portion of the cooling fluid conduit is a second integral tube extending outwardly through the outer collar portion of the nozzle from the helical portion of the fluid conduit, and having a second outer connection to be connected to a cooling fluid return line.

* * * * *